(12) United States Patent
Ummadi et al.

(10) Patent No.: US 10,349,666 B2
(45) Date of Patent: Jul. 16, 2019

(54) SHELF-STABLE CONFECTIONERY PRODUCTS

(75) Inventors: Madhavi Ummadi, Bakersfield, CA (US); Madansinh Nathusinh Vaghela, Bakersfield, CA (US); Aaron Beth Butterworth, Bakersfield, CA (US); Nirav Chandrakant Pandya, Bakersfield, CA (US); Bridgett Lynn McCune, Bakersfield, CA (US); Christophe Joseph Etienne Schmitt, Servion (CH); Joumana Saikali, Paris (FR); Paola Olmos, Meriel (FR)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 13/813,795

(22) PCT Filed: Jul. 22, 2011

(86) PCT No.: PCT/EP2011/062617
§ 371 (c)(1),
(2), (4) Date: Feb. 1, 2013

(87) PCT Pub. No.: WO2012/016852
PCT Pub. Date: Feb. 9, 2012

(65) Prior Publication Data
US 2013/0136842 A1 May 30, 2013

(30) Foreign Application Priority Data
Aug. 5, 2010 (EP) ..................................... 10171993

(51) Int. Cl.
*A23G 9/38* (2006.01)
*A23G 9/40* (2006.01)

(52) U.S. Cl.
CPC .................. *A23G 9/40* (2013.01); *A23G 9/38* (2013.01); *A23V 2002/00* (2013.01)

(58) Field of Classification Search
CPC .................................... A23G 9/38; A23G 9/40
USPC ........................................ 426/107, 657, 660
See application file for complete search history.

(56) References Cited

U.S. PATENT DOCUMENTS

| | | | | |
|---|---|---|---|---|
| 2,193,950 | A | * | 3/1940 | Turnbow ...................... 426/565 |
| 4,213,896 | A | | 7/1980 | Davis |
| 5,104,674 | A | * | 4/1992 | Chen .................. A23C 19/0765 426/496 |
| 5,232,731 | A | | 8/1993 | Cain et al. |
| 5,308,628 | A | | 5/1994 | Schol et al. |
| 5,350,590 | A | | 9/1994 | McCarthy et al. |
| 5,413,804 | A | | 5/1995 | Rhodes |
| 5,714,182 | A | | 2/1998 | Bisson et al. |
| 5,753,294 | A | | 5/1998 | Savello |
| 5,925,392 | A | | 7/1999 | Sponholtz |
| 8,936,821 | B2 | * | 1/2015 | Ummadi .................. A23G 9/20 426/101 |
| 9,252,956 | B2 | | 2/2016 | Falk |
| 2008/0050497 | A1 | * | 2/2008 | Mai et al. ...................... 426/575 |
| 2009/0136643 | A1 | * | 5/2009 | Bovetto .................. A23G 9/38 426/565 |
| 2009/0304866 | A1 | * | 12/2009 | Bovetto et al. ................. 426/61 |

FOREIGN PATENT DOCUMENTS

| | | | |
|---|---|---|---|
| DE | 19610672 | 9/1997 | |
| EP | 0308091 | 3/1989 | |
| EP | 0519394 A1 * | 12/1992 | ............... A23G 9/04 |
| EP | 0616774 | 9/1994 | |
| EP | 0696426 | 2/1996 | |
| EP | 1839495 | 10/2007 | |
| GB | 195224 | 3/1923 | |
| GB | 2191676 | 12/1987 | |
| WO | 89/05587 | 6/1989 | |
| WO | 95/01102 | 1/1995 | |
| WO | 97/46111 | 11/1997 | |
| WO | WO9823169 | * 6/1998 | ............... A23G 9/02 |
| WO | 2010/092091 | 8/2010 | |
| WO | 2012016857 | 2/2012 | |

OTHER PUBLICATIONS

Milk Facts "Nutrient Content of Milk Varieties", p. 1, printed Jan. 8, 2015 http://www.milkfacts.info/Nutrition%20Facts/Nutrient%20Content.htm.*
Arbuckle Ice Cream 2nd Edition, p. 35 The AVI Publishing Group 1972.*
Arbuckle Ice Cream, 2nd Edition The AVI Publishing Group 1972, pp. 35, 50, 79, 98-100, 103, 104, 212 and 213.*
Young Whey Products in Ice Cream and Frozen Dairy Desserts, U.S. Dairy Export Council 2007, pp. 1-12.*
R. Marshall, et al., "Ice cream. Chapter 9. Mix Processing, Fifth Edition," Jan. 1, 2000, pp. 139-163, XP002282749.
International Search Report and Written Opinion dated Jan. 18, 2012 for corresponding Intl. Appln. PCT/EP2011/062617, pp. 1-13.
Office Action issued in related Mexican Patent Application No. MX/a/2013/001080 dated Apr. 18, 2017, considered only as disclosed—not in English, pp. 1-5.
Silva et al. "Ice-Cream Sensory Evaluation Formulated With Product of Acid Bovine Milk Serum" Cienc. Tecnol. Aliment., Campinas, Jan.-Mar. 2006, vol. 26, No. 1, pp. 116-122, not in English—considered only as disclosed.
Brazil Office Action in related Application No. BR112013002860-2 dated Oct. 31, 2017, 7 pages, considered only as disclosed—not in English.

* cited by examiner

*Primary Examiner* — Kelly J Bekker
(74) *Attorney, Agent, or Firm* — K&L Gates LLP

(57) ABSTRACT

The present invention relates to confectionery products which are shelf-stable and are suitable for quiescent freezing to form frozen confectionery products. In particular, the invention is concerned with unfrozen packaged confections comprising a coagulated protein system which contributes to the stability of the confections in particular when stored at room or chilled temperatures. A method of producing such confectionery products and the products obtainable from the method are also part of the present invention. The use of the products for providing frozen desserts also forms part of the invention.

17 Claims, 1 Drawing Sheet

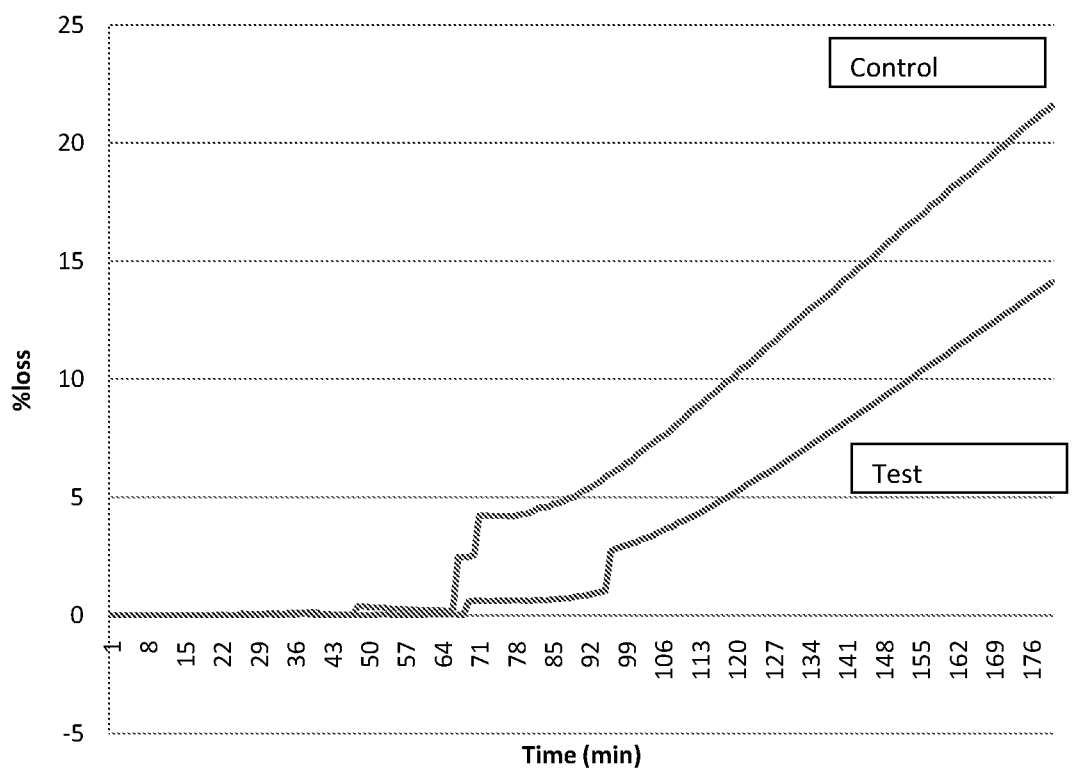

SHELF-STABLE CONFECTIONERY PRODUCTS

CROSS REFERENCE TO RELATED APPLICATIONS

The present application is a National Stage of International Application No. PCT/EP2011/062617, filed on Jul. 22, 2011, which claims priority to European Patent Application No. 10171993.8, filed Aug. 5, 2010, the entire contents of which are being incorporated herein by reference.

FIELD OF THE INVENTION

The present invention relates to unfrozen packaged confectionery products for the preparation of quiescently frozen confectionery products. In particular, the invention is concerned with unfrozen packaged confections comprising a coagulated protein system which contributes to the shelf stability of the product and to the improvement of melting behaviour of the confections once quiescently frozen. Such a protein system is also used according to the invention in these unfrozen confectionery products in order to improve their stability, in particular when stored at room or chilled temperatures. A method of producing such confectionery products and the products obtainable from the method are also part of the present invention. The use of the products for providing desserts quiescently frozen also forms part of the invention.

BACKGROUND OF THE INVENTION

Frozen confectionery products are very pleasurable and prised by consumers. However, producing and distributing ice creams is a costly and non-environmental-friendly process.

In addition, along the distribution chain, the frozen products are subjected to temperature abuse which negatively affects their texture and sensory properties.

Providing a dessert which could be stored at ambient temperature would solve a number of these problems.

Most current solutions consist in water-ice types of products that are frozen at home or in stores. These are no sophisticated ice cream products.

There are also some ice cream dessert mixes available on the market but once frozen by consumers, their aspect is quite simple and not appealing. In addition, it is not possible to form ice cream balls and to serve them in an appealing way as the frozen desserts are too hard to scoop at serving temperature and then melt quickly. These also generally comprise high levels of alcohols and additives to prevent the appearance of an icy texture and avoid microbiological issues.

In addition there is a need to provide high quality products which are shelf-stable at ambient or chilled temperatures and which, when frozen and consumed, have excellent organoleptic properties.

SUMMARY OF THE INVENTION

The present invention now solves the foregoing problems by providing a shelf-stable confectionery product having improved melting behaviour when consumed following a quiescent freezing.

In a first aspect, the invention relates to an unfrozen packaged confectionery product for the preparation of statically frozen confection comprising a coagulated protein system including casein and whey protein, wherein the coagulated protein system is obtainable by subjecting a composition comprising dairy proteins at a pH between 5.6 and 6.5 to a heat treatment at 80-90° C. or above 90° C. up to 160° C., for a time period of 5 seconds to 30 minutes.

The products of the invention once quiescently frozen and consumed present improved melting behaviour without any compromise on organoleptic properties, in particular in terms of texture and mouthfeel. Besides, the products of the invention show good stability and can therefore be stored at ambient or chilled temperatures.

The invention also relates to a method of producing an unfrozen packaged confectionery product for the preparation of statically frozen confections wherein controlled heat and acidic conditions are applied to a confectionery mix in such a way to provide a coagulated protein system within the mix. The mix is further packaged for distribution and storage at ambient or chilled temperatures.

More particularly, a method for producing an unfrozen packaged confectionery product for the preparation of a statically frozen confection comprising the steps of:

a) providing a confectionery mix comprising dairy protein, at a pH of between 5.6 and 6.5, preferably between 5.8 and 6.3;
b) optionally homogenising the mix;
c) subjecting the mix to a heat treatment at a temperature of 80-90° C. or above 90° C. up to 160° C., for a time period of 5 seconds to 60 minutes, to at least partially form a coagulated protein system including casein and whey protein;
d) cooling the mix
e) optionally aerating the mix
f) optionally shaping the mix
g) filling the mix in a packaging
h) storing the mix at a temperature of 0° C. to 30° C. is also part of the present invention.

A further method for producing an unfrozen packaged confectionery product for the preparation of a statically frozen confection which comprises the steps of:

a) providing a confectionery mix comprising dairy protein, at a pH of between 5.6 and 6.5, preferably between 5.8 and 6.3
b) optionally homogenising the mix
c) filling the mix in a packaging
d) subjecting the packaged mix to a heat treatment, at a temperature of 80-90° C. or above 90° C. up to 160° C., for a time period of 5 seconds to 60 minutes, to at least partially form a coagulated protein system including casein and whey protein;
e) cooling the packaged mix;
f) storing the packaged mix at a temperature of 0° C. to 30° C.

forms also part of the invention.

The products obtainable by these methods also form an embodiment of the present invention.

In another aspect of the invention, the use of a confectionery product as defined above for the production of a quiescently frozen dessert is provided.

In the products of the invention, the coagulated protein system preferably includes milk proteins, caseins, whey proteins or mixtures thereof that have been coagulated by a heat treatment in a mild acidic environment e.g. through the presence of molasses or of an organic acid. More particularly, the coagulated protein system of the products of the invention includes casein and whey protein in the form of complexes or aggregates. The coagulated protein system is present in an amount sufficient to provide shelf stability to the products when stored at room or chilled temperature. Typically, the coagulated protein system is present in the confectionery product in an amount of 0.5 to 4%.

DETAILED DESCRIPTION OF THE INVENTION

In the following description, the % values are in wt % unless otherwise specified.

In the following description pH values correspond to values at 25° C. measured by standard equipment.

The invention pertains to unfrozen packaged confectionery products for the preparation of statically frozen confections which texture and mouthfeel is improved as a result of an optimized process of preparation of the confectionery products including the controlled use of heat in acidic conditions.

By "confectionery product" is meant any product which upon freezing gives products such as ice cream, mellorine or any frozen dessert etc.

In the present disclosure, the terms "static freezing" or "quiescent freezing" are used interchangeably and are taken to have the same meaning, namely a freezing with no stirring by opposition to a dynamic freezing.

According to a first embodiment the product of the invention is not aerated.

According to another embodiment, the products may be aerated to an overrun of at least 20%, preferably at least 40% and more preferably at least 90%. In a most preferred embodiment, the overrun is 100-120%.

In a first aspect, the invention relates to an unfrozen packaged confectionery product suitable for quiescent freezing comprising a coagulated protein system including casein and whey protein.

The term "coagulated protein system" is to be understood to mean a complex or an aggregate resulting from at least a partial coagulation of proteins present in a composition comprising dairy protein, induced by a heat treatment, in the presence of an acid component.

Preferably, the proteins at the origin of the coagulation are milk proteins which comprise caseins and whey proteins.

The coagulated protein system is obtainable by subjecting a composition comprising dairy proteins and having a pH between 5.6 and 6.5, preferably between 5.8 and 6.3 to a heat treatment at a temperature of 80-90° C. or above 90° C. up to 160° C., preferably 95-135° C., more preferably 100-130° C.

When reference is made to the pH, unless otherwise specified, it corresponds to the pH of the composition measured at 25° prior to the heat treatment.

Typically, at least 30%, preferably at least 45%, more preferably at least 60% of dairy protein is converted to said coagulated protein system.

In order to reach required acidic conditions, any acidic component such as those selected from liquid molasses, organic acids, such as citric acid, ethylenediaminetetraacetic acid (EDTA), fruit derived acids may be used.

Preferably, the coagulated protein system is present in the product of the invention in an amount of 0.5 to 4 wt %.

Such a system offers the unexpected advantage that it can confer improved shelf-stability to the unfrozen packaged product while at the same time improving melting properties of the frozen confectionery product obtained after quiescent freezing of the packaged product of the invention without compromising on sensory attributes.

The product is preferably not fermented.

According to a particular embodiment, the product of the invention comprises 0.5-20% fat, 5-15% milk solids non fat (MSNF) and 5-30% of a sweetening agent. Preferably, it comprises 15-25% sweetening agents. Preferably, it comprises less than 15% fat, more preferably 0.5 to 12% fat. It may also comprise a stabilizer system including an emulsifier in an amount up to 6%.

The amount of protein present in the confectionery product is preferably less than 4.5%, more preferably between 2 and 4%.

By "sweetening agent" it is to be understood ingredients or mixture of ingredients which impart sweetness to the final product. These include natural sugars like cane sugar, beet sugar, molasses, other plant derived nutritive sweeteners, and non-nutritive high intensity sweeteners. Typically, the sweetening agents are selected from dextrose, sucrose, fructose, corn syrups, maltodextrins.

By "stabiliser system" is to be understood a mixture of ingredients which contributes to the stability of the product per se but also when frozen with respect to ice crystal formation, heat shock resistance, overall texture properties etc. Thus, the stabiliser system may comprise any ingredients which are of structural importance to the confectionery, even when frozen. Stabiliser system may contain emulsifiers and or stabilisers.

The products of the invention are characterised in that they are shelf-stable. By "shelf-stable" is meant that no degradation of the product occurs for at least 6 months, when stored at room temperature, or for at least 8 months, when stored at chilled temperatures. By room temperature is meant 15-30° C. By chilled temperatures is meant 0-15° C.

The stabiliser system used in the present products preferably comprises at least one emulsifier, Any food grade emulsifier typically used in frozen or unfrozen confection could be used. Suitable emulsifiers include sugar esters, emulsifying waxes such as beeswax, carnauba wax, candedilla wax, plant or fruit waxes and animal waxes, polyglycerol fatty acid esters, in particular PGMS, polyglycerol polyricinoleate (PGPR), polysorbates (polyoxyethylene sorbitan esters), monoglycerides, diglycerides, lecithin and mixtures thereof.

Stabilizers present in the stabilizing system may be, for instance, a hydro-colloid such as agar, gelatine, gum acacia, guar gum, locust bean gum, gum tragacanth, carrageenan, carboxymethylcellulose, sodium alginate or propylene glycol alginate or any mixture of hydrocolloids.

The product may additionally comprise flavourings or colourings. These are used in conventional amounts which can be optimized by routine testing for any particular product formulation.

The acidic pH of the composition comprising dairy protein is controlled by the presence of an acidic component. The acidic component is preferably selected from the group consisting of molasses, an organic acid such as citric acid, ethylenediaminetetraacetic acid (EDTA), fruit derived acids, or mixtures thereof.

The confectionery products of the present invention may be frozen to provide consumers with frozen desserts for example. Typically, the products of the invention are frozen statically in standard freezers, such as home freezers. This enables the consumer to prepare the frozen dessert himself at the time of consumption starting from a product according to the invention.

Typically, the consumer places the packaged confectionery product in a freezer at −20° C. to −18° C. and allows the product to be frozen. Generally, the time required is between 2 to 6 hours.

It has surprisingly been found, that the products of the invention are very stable despite the freezing and thawing which may occur during manufacture. This can be attributed to the presence of a coagulated protein system which imparts stability to the product, which is beyond what commercial products have hitherto offered.

Therefore, it has been surprisingly found out that the presence of the coagulated protein system the confectionery products of the invention improves the melting behaviour of the product once frozen and consumed and in particular that it improves its resistance to melting, while keeping a smooth and creamy texture.

This effect is even more surprising given that it is known from the art that protein coagulation has a negative impact on the organoleptic characteristics of ice cream products. In this regard, EP 1 342 418 teaches a method for preparing a frozen ice cream containing an acid component but ensuring that at least one protein does not react with the acid. According to this teaching, the contact time between the acid and the protein should be kept to a minimum.

Without being bound by theory, it is believed that a coagulated protein system within the confectionery mix is provided, with freshly coagulated protein that act as a stabilizer for the air cells and enable creation of a very fine and stable microstructure.

The coagulated protein system including casein and whey protein is aggregated with the fat to provide protein-fat aggregates.

The products of the invention are impacted by the presence of the coagulated protein system in such a way that compared to a product with no such coagulated system, one observes an increase in the volume of particles between 1 and 10 μm.

In the present disclosure, the terms "particle size" is designating what is known in the art as $D_{[3,2]}$. $D_{[3,2]}$ is the equivalent surface area mean diameter or the Sauter mean diameter of the particles of the coagulated protein system aggregated with fat as measured by laser diffraction on e.g. a Mastersizer Micro Particle Size Analyzer, from Malvern Instruments Ltd (UK). These particle sizes can be measured in the mix as well as in the end product. For measurements, samples are dispersed in water and measured according to the instructions of the instrument manufacturer. Frozen samples are allowed to melt before measuring. When the mix including proteins are subjected to a process as described above, one observes an increase of $D_{[3,2]}$ of up to 8% depending on the used formulation.

The particle size distribution of a formulation (ice cream mix) that does not contain the coagulated protein system is different from the same formulation that is treated according to the process of the invention which causes partial coagulation of the proteins in the formulation.

In particular when the described heat and acidic conditions are applied, the volume of particles below 1 micron i.e. the fraction of particles expressed in % of volume that are below 1 micronis reduced up to 10%.

Thus, the coagulated protein system creates a three dimensional network that has the ability to have increased water binding capacity avoiding syneresis during storage and results in an improvement of sensory attributes relating to texture and flavour in the end product.

The product may be further characterised by a non-sedimentable protein content below or equal to 60% of the total protein content.

What is meant by "non-sedimentable protein", "non-sedimentable casein" or yet "non-sedimentable whey protein" is the amount of corresponding protein in the soluble fraction of the confection at room temperature (25° C.) and centrifuged at 50,000 g for 30 min using for example a Sorvall RC-5 plus centrifuge equipped with a SM 24 rotor or an equivalent device enabling to apply similar acceleration during the same time.

Another methodology to determine the denaturated or coagulated proteins is the fractionation method by Rowland S. J., J. Dairy Res. 9 (1938) 42-46.

$$100 - \left(\frac{\text{undenaturated whey protein}}{\text{total whey protein}} \times 100\right) =$$
$$100 - \left(\frac{SPN}{(TN - NPN) \times f} \times 100\right)$$

Where
SPN: Serum Protein Nitrogen
NCN: Non Casein Nitrogen
NPN: Non Protein Nitrogen
TN: Total Nitrogen The content of non-sedimentable or "soluble" protein in the confectionery product is inversely proportional to the amount of coagulated protein system in said product. Thus, an important amount of coagulated protein system in the confectionery product will reduce the amount of non-sedimentable protein in said confectionery product.

Most milk proteins (mainly caseins) in their native state remain in colloidal suspension form leading to minimal changes to mix viscosity (~200-400 cp). However, when proteins are subjected to controlled exposure to known amounts of heat and acid (e.g. pH of 6.1 or less) they undergo coagulation. Coagulation is a state where the proteins are hydrated resulting in a three dimensional network (soft gel) causing increased mix viscosity (1800-2400 cp). If the exposure of proteins to heat and acid is not controlled, this phenomenon could lead to precipitation (e.g. syneresis in yogurt). In the worst case scenario, the liquid separates from the precipitate and the size of the solids decreases.

The applicant has discovered that the shelf stability of unfrozen packaged confectionery products of the invention is improved as a result of the presence of a coagulated protein system obtained by an optimized process of preparation including the controlled use of heat and acidic conditions.

It can therefore be concluded that the conditions described in the present invention applied to the composition comprising dairy proteins are leading to the formation of covalent complexes (probably linked by disulphide bonds) between casein and whey protein and that these complexes are more numerous in the control sample (higher initial kappa-casein band density). Without being bound by theory, it is believed that casein micelles are coated with whey protein including beta-lactoglobulin under the heat and acidic conditions of the present invention and are either entrapped in the fat phase or in the insoluble phase after centrifugation, leading to a depletion of the protein aggregates in the soluble phase. The non-sedimentable aggregates are mainly composed of beta-lactoglobulin and casein complexes that did not adsorb with the casein micelles to the fat droplet interface during the confectionery manufacture or were not sensitive to centrifugation, but remained in the bulk phase. The coagulated protein system of the invention therefore consists on the one hand in casein micelles/whey protein complexes which can be defined as covalent protein aggregates formed between the kappa-casein typically from the surface of the casein micelles. On the other hand, the coagulated protein system consists mostly in no n-sedimentable casein/beta-lactoglobulin complexes present in the confection bulk.

The amount of casein and whey protein can be measured from Coomassie Blue gel electrophoresis analysis. The content of these two proteins can be determined from analysis of the intensity of the corresponding migration bands on reduced electrophoresis Nu-PAGE gels.

Method:

For total sample, an aliquot of 10 g of melted ice cream was dispersed in 90 g of a deflocculating aqueous solution at pH 9.5 containing 0.4% EDTA and 0.1% Tween 20. The soluble phase was obtained by centrifugation of the melted ice cream at 50,000 g for 30 min. Samples were then analyzed by gel electrophoresis on Nu-PAGE 12% Bis-Tris using the MOPS running buffer in reducing and non-reducing conditions (reducing conditions should break any covalent bound involving SH/SS exchange during heating) as described in "Invitrogen Nu-PAGE pre-cast gels instructions" (5791 Van Allen Way, Carlsbad, Calif. 2008, USA). Gels were stained with Coomassie blue (Invitrogen kit no. LC6025). The total sample and the corresponding soluble phase were deposited on the same electrophoresis gel at a concentration of 0.5 mg·mL$^{-1}$. After migration and staining with colloidal blue, the gels were scanned in 256 gray levels with a resolution of 1000 dpi using a UMAX scanner coupled with the MagicScan 32 V4.6 software (UMAX Data Systems, Inc.) leading to pictures having a size of 16 MB. These pictures were then analyzed using the TotalLab TL120 v2008.01 image analysis software (Nonlinear Dynamics Ltd, Cuthbert House, All Saints, Newcastle upon Tyne, NE1 2ET, UK). Migration lanes were detected automatically by the software. Then, image was corrected for background using the "rolling ball" option with a radius of 200. Protein bands corresponding to bovine serum albumin (BSA), β-casein, αs1- and αs2-casein, κ-casein, β-lactoglobulin (β-lg) and α-lactalbumin (α-la) were detected manually using the migration bands from a skimmed milk as a standard. The intensity of the bands was converted into peak migration profiles for each migration lane for the total sample and the soluble phase. These peaks were then fitted with a Gaussian model in order to calculate their area for each protein, and thereby the concentration of the protein in the sample.

The peak area determined for a protein in the soluble phase was thereafter corrected by the effective protein content determined by the Kjeldahl method (described thereafter) and normalised by the peak area of the corresponding protein in the total sample.

The amount of proteins present in the soluble phase after centrifugation can also be measured by Kjeldahl method using a conversion factor of 6.38 for milk proteins.

Kjeldahl Method:

Kjeldahl is a general method allowing the determination of total nitrogen, using a block-digestion apparatus and automated steam distillation unit.

This method is applicable to a wide range of products, including dairy products, cereals, confectionary, meat products, pet food, as well as ingredients containing low levels of protein, such as starches. Nitrogen from nitrates and nitrites is not determined with this method. This method correspond to the following official methods: ISO 8968-1/IDF 20-1 (milk), AOAC 991.20 (milk), AOAC 979.09 (grains), AOAC 981.10 (meat), AOAC 976.05 (animal feed and pet food), with small modifications (adaptation of catalyst quantity and sulphuric acid volume for digestion, and adaptation of boric acid concentration for automated system).

Principle of the method: Rapid mineralisation of the sample at about 370° C. with sulfuric acid and Missouri catalyst, a mixture of copper, sodium and/or potassium sulfate, which transforms organically bound nitrogen to ammonium sulfate. Release of ammonia by addition of sodium hydroxide. Steam distillation and collection of the distillate in boric acid solution. Acidimetric titration of ammonium.

Apparatus: Mineralisation and distillation unit in combination with a titration unit.

Manual, semi-automated and automated conformations are possible.

These methods are known from a skilled person in the art of frozen confectionery who has a good knowledge of proteins.

Furthermore, the benefit of the system according to the invention extends to other parts of the cold-chain distribution of such products, in that products which have gone through typical heat shock or distribution abuse maintain the smooth, creamy texture longer than other products that are subjected to the same treatment.

The above advantages are surprisingly maintained when the products of the invention are stored at room or chilled temperatures and then frozen by the consumer.

The products of the invention also offer the advantage that a very convenient product can be offered which has a reduced carbon footprint by requiring less energy than typical ice confectionery to manufacture. While being frozen by the consumer at the point of consumption, it still has a taste and texture superior or equal to standard ice confections.

Thus, the use of a confectionery product according to the present invention for the production of a frozen dessert by static or quiescent freezing is provided. The frozen dessert may be any of ice cream, mellorine, milk shake etc.

In addition, the products of the invention need not be stored in freezers, but can be stored at room temperature or chilled temperatures. This has the advantage that it suppresses the need for shop owners to have a freezer cabinet in their shops thus reducing carbon footprint and energy expenditure.

A method for producing the products of the invention also forms part of the invention, and more particularly a method of producing an unfrozen packaged confectionery product for the preparation of a statically frozen confection comprising proteins which are freshly coagulated within the confectionery mix which can be further homogenised, pasteurised and packaged.

According to a particular embodiment, the method comprises as a first step providing a confectionery mix comprising dairy proteins. Preferably, the amount of dairy protein in the ingredient mix is ranging from 1 to 7 wt %, preferably 2 to 4 wt % of the mix.

Sources of dairy protein typically include liquid fresh milk, milk powder, standardised milk powder, skimmed milk powder, acid casein, sodium caseinate, acid whey, whey protein concentrate, whey protein isolate, sweet whey, demineralised sweet whey, demineralised whey or any mixtures thereof.

The pH of the confectionery mix is comprised between 5.6 and 6.5, preferably between 5.8 and 6.3. This is typically achieved by including an acidic component such as those selected from liquid molasses, organic acids, such as citric acid, ethylenediaminetetraacetic acid (EDTA), fruit derived acids may be used.

Preferably, the confectionery mix also comprises any of fat, preferably in an amount of 0.5-20%, milk solids non-fat, preferably in an amount of 5-15%, sweetening agent, preferably in an amount of 5-30%, a stabiliser system, preferably in an amount of 0 to 6%, flavours, colourings, protein, water, acidifying components or any mixtures thereof. Egg yolk solids may also be present in an amount of 0.5 to 1.4 wt % of the mix.

Preferably, the ingredient mix is not fermented.

The mix is then optionally homogenized. Typically, homogenisation is carried out at a pressure of between 40 and 200 bars, preferably between 100 and 150 bars, more preferably between 120 and 140 bars.

The mix is then subjected to a heat treatment at a temperature comprised between 80 and 90° C. for 5 seconds to 30 minutes. Alternatively, the temperature may be above 90° C. up to 160° C. for 5 seconds to 60 minutes. Preferably, the temperature is 95-135° C., more preferably 100-130° C. The partial coagulation results from the controlled heat treatment in the presence of acidified proteins.

The composition is heat treated to at least partially form a coagulated protein system including casein and whey protein. Thus, the confectionery product preferably has a content of non-sedimentable protein which is below or equal to 60%, preferably below 50% of the total protein content.

The heat treatment allows killing any pathogens which may be present in the mix and thus ensures microbiological stability of the product. Simultaneously, the heat treatment enables the formation of a coagulated protein system.

The mix may then be cooled to around 2 to 8° C. by known means. The mix may further be aged for 4 to 72 h at around 2 to 6° C. with or without stirring.

In the next step, the mix is preferably aerated.

The confectionery product is preferably aerated in aseptic conditions to an overrun of at least 20%, preferably at least 40%, more preferably at least 90%. The overrun is preferably up to 150%. Most preferably, the overrun is comprised between 100-120%.

The aerated mix is then packaged. This is typically achieved by filling the mix or aerated composition in packaging, such as cartridges, boxes, bulks, squeezable pouchs, cans, sticks, cones. Preferably, the filling is aseptic.

The mix is then stored at temperatures ranging from 0° C. to 30° C.

In an alternative embodiment, the confectionery mix comprising dairy proteins at a pH of between 5.6 and 6.5, preferably between 5.8 and 6.3 which has been optionally homogenised is then packaged.

The packaged mix may then undergo the heat treatment as described above. This retort process allows the mix to be pasteurised and thus ensures microbiological safety of the product. Simultaneously, the coagulated protein system is formed directly in the packaged mix thus imparting to the product all the advantages mentioned herein.

In this embodiment, the packaged mix is then cooled preferably to a temperature of 4-20° C. and stored at 0° to 30° C.

The method of the invention lends itself to the manufacture of confectioneries which are shelf-life stable at the necessary storage temperatures and have good organoleptic and textural properties. In addition, the presence of this coagulated protein system allows the product to be stored at higher temperatures than are conventionally used without affecting the organoleptic properties of the product which is suitable for freezing prior to consumption.

The confectionery products obtainable by the present methods also form part of the invention. Such products typically comprise 0.5-20% fat, 5-15% MSNF, 5-30%, preferably 15-25% of a sweetening agent. Preferably, the amount of fat is less than 15%, more preferably from 0.5 to 12%. They may also comprise a stabilization system in an amount up to 6%. The amount of protein in such products is typically between 1 and 7%, preferably less than 4.5%, more preferably between 2-4%.

FIGURES

FIG. 1 shows the results of a drip test-melting performed on a product according to the invention compared with a control as defined in Example 1

EXAMPLES

The present invention is illustrated further herein by the following non-limiting examples.

Example 1

Ready-to-Freeze Aerated Dessert, Heat Treated Before Packaging

TABLE 1

| Ingredient | Wt % of final product |
|---|---|
| Fat | 10 |
| Sugar | 12.5 |
| Glucose syrup 40 DE | 4.5 |
| MSNF | 7.5 |
| Whey Solids | 2.5 |
| Guar | 0.15 |
| CMC | 0.05 |
| Carrageenan | 0.02 |
| PGMS | 0.3 |
| Unsaturated monoglycerides | 0.05 |
| Water | 62.4 |
| Total Solids | 35 |
| Total proteins | 2.5 |

Conventional mix-making procedures were followed.

In a first variable, referred to as "Control 1", the pH of the mix was 6.8 at 25° C. before heat treatment. No other acidulants were added to the mix. In a second variable "test 1", citric acid was used to lower the pH to 6.2 before sterilization.

Both variables were then processed the same way:

homogenisation (160 bar)

Heat treatment 95° C. to 135° C. for 10 to 90 seconds

Cooling to 4° C.

Aging for 24 hours at 4° C.

Foaming (MiniMondomix) to provide 100% overrun

Then the sterile mixes were aseptically packed in tubs of 200 ml and stored at 20° C.

After 7 hours, the product according to the invention did not present drainage in contrast with the control foam.

Example 2

Frozen Confections Prepared by Quiescent Freezing

The control and test foams of example 1 were quiescently frozen at −18° C.

The melting behaviour of both frozen foams was analysed following drip test methodology. This methodology consists in installing the frozen confection into a grid at constant temperature of 20° C. and humidity. The weight of the material that drips between the grids is recorded every minute during 120 minutes. The losses of material when the frozen confection melts are expressed as percentage with respect to the initial weight.

The results are reported in FIG. 1 and show that the frozen foam according to the invention has more resistance to melting once quiescently frozen than the control.

Example 3

Frozen Dairy Dessert Containing 11% Fat, Sterilized into the Packaging

TABLE 1

| Ingredient | Wt % of final product |
| --- | --- |
| Fat | 11 |
| Sugar | 19-20 |
| MSNF | 10.9 |
| Natural emulsifier | 0.1-0.35 |

In this variable, referred to as "Control 2", conventional mix-making procedures were followed to yield to a 11.0% fat and 10.9% MSNF mix. The measured pH of the mix was 6.6 before sterilization. No other acidulants were added to the mix. The mix was packed and then heat treated by a retort method process at 121° C. for 40 to 60 min. In a second variable a similar mix with 11.0% by weight fat and 10.9% MSNF was tested following a controlled reduction in pH. A citric acid solution was used to lower the pH value to 6.2 before heat treatment the mix was then process, at 121° C. for 40 to 60 min. The two variables were stored at 20° C. during several months; afterwards they were frozen on a static freezer during 6 hours at -20° C.

The product made with controlled reduction in pH was significantly smoother, creamer and more stable compared to "Control 2"

Example 4

Particle Size Measurement of Coagulated Protein System 2.5 g frozen confectionery mix is allowed to melt into 10 times its weight in water (e.g. 2.5 g+25 mL). The mix is pre-dispersed in 25 mL deionized water. No deflocculating solution is used.

The measurement is done at ambient temperature (approximately 23-25° C.) on Malvern Micro particle size analyzer, using presentation NFD.

The sample is added until obscuration reaches 20+/-3% (usually 17-20%), followed by 30 seconds circulation before taking the measurement. Pump speed is set at 1600 rpm, which is near the minimum for the Malvern Micro to circulate the sample, and not so much as to pull in air from the vortex.

The normalized "q3" values are obtained as the percent volume in each channel divided by the logarithm of channel width, according to ISO 9276:

$$Q3=0.01*(\% \text{ in channel})/\log([\text{upper diameter limit of channel}]-[\text{lower diameter limit of channel}]).$$

The invention claimed is:

1. An unfrozen packaged confectionery product for preparation of a statically frozen ice cream or statically frozen mellorine, the product is produced by subjecting a composition having a pH between 5.8 and 6.3, comprising 2 to 4 wt. % proteins comprising dairy proteins, comprising 5-30% of sweetening agent by weight, comprising citric acid, and comprising 5 to 12% fat by weight of the composition to a heat treatment at 120 to 145° C. for a time period of 5 seconds to 30 seconds, the composition is not homogenized after the heat treatment, the product comprising an aggregated protein system comprising complexes of casein and whey protein aggregated with the fat.

2. The unfrozen packaged confectionery product according to claim 1, wherein the aggregated protein system is present in an amount of 0.5 to 4% by weight.

3. The unfrozen packaged confectionery product according to claim 1, which is not fermented.

4. The unfrozen packaged confectionery product according to claim 1, wherein the composition having the pH between 5.8 and 6.3 and subjected to the heat treatment comprises whey solids, milk solids non-fat, and a stabiliser system including a stabilizer and an emulsifier,
the whey solids are selected from the group consisting of acid whey, whey protein concentrate, whey protein isolate, sweet whey, demineralised sweet whey, demineralised whey, and mixtures thereof,
the sweetening agent is selected from the group consisting of dextrose, sucrose, fructose, corn syrups, maltodextrins, and mixtures thereof,
the stabilizer is selected from the group consisting of agar, gelatine, gum acacia, guar gum, locust bean gum, gum tragacanth, carrageenan, carboxymethylcellulose, sodium alginate, propylene glycol alginate, and mixtures thereof,
the emulsifier is selected from the group consisting of sugar esters, beeswax, carnauba wax, candedilla wax, plant waxes, fruit waxes, animal waxes, polyglycerol monostearate, polyglycerol polyricinoleate, polyoxyethylene sorbitan esters, monoglycerides, diglycerides, lecithin and mixtures thereof, and
the stabilizer system is present in an amount up to 6% by weight.

5. The unfrozen packaged confectionery product according to claim 1, which is shelf-stable.

6. The unfrozen packaged confectionery product according to claim 1, which is aerated to an overrun of at least 20%.

7. The unfrozen packaged confectionery product of claim 1, wherein the mix is homogenized before the heat treatment.

8. The unfrozen packaged unfrozen confectionery product of claim 1, further comprising a natural emulsifier provided by the composition subjected to the heat treatment, and the natural emulsifier is 0.1 to 0.35 wt. % of the product.

9. The unfrozen packaged confectionery product of claim 1, wherein the product is produced by cooling the composition after the heat treatment, then filling the composition into a packaging, and then storing the composition at a temperature of 0° C. to 30° C.

10. The unfrozen packaged confectionery product of claim 9, wherein the cooling of the composition gives the composition a temperature of 2 to 8° C.

11. The unfrozen packaged confectionery product of claim 1, wherein the product is produced by filling the composition into a packaging before the heat treatment such that the heat treatment is performed on the packaged composition, then cooling the packaged composition after the heat treatment, and then storing the packaged composition at a temperature of 0° C. to 30° C.

12. The unfrozen packaged confectionery product of claim 11 wherein, before the storing of the packaged composition at the temperature of 0° C. to 30° C., the packaged composition has a temperature of 4 to 20° C. from the cooling.

13. The unfrozen packaged confectionery product according to claim 1, which has an overrun of 100-120%.

14. The unfrozen packaged confectionery product according to claim 1, wherein the aggregated protein system contains at least 60% of the dairy proteins in the product.

15. The unfrozen packaged confectionery product according to claim 1, having a non-sedimentable protein content no greater than 50% of the total protein content.

16. The unfrozen packaged confectionery product according to claim 10, consisting of (i) the dairy proteins, (ii) the sweetening agent, (iii) the fat, (iv) water, (v) citric acid, (vi) an emulsifier selected from the group consisting of sugar esters, emulsifying waxes, polyglycerol fatty acid esters, polysorbates, monoglycerides, diglycerides, lecithin, and mixtures thereof and (vii) a stabilizer selected from the group consisting of agar, gelatine, gum acacia, guar gum, locust bean gum, gum tragacanth, carrageenan, carboxymethylcellulose, sodium alginate, propylene glycol alginate, and mixtures thereof.

17. The unfrozen packaged confectionery product according to claim 12, consisting of (i) the dairy proteins, (ii) the sweetening agent, (iii) the fat, (iv) water, (v) citric acid and (vi) a natural emulsifier.

* * * * *